(12) United States Patent
Gotoda et al.

(10) Patent No.: US 9,216,733 B2
(45) Date of Patent: Dec. 22, 2015

(54) CONTROL DEVICE FOR HYBRID VEHICLE

(71) Applicants: Kenji Gotoda, Mishima (JP); Koji Hayashi, Nagakute (JP); Koki Ueno, Toyota (JP)

(72) Inventors: Kenji Gotoda, Mishima (JP); Koji Hayashi, Nagakute (JP); Koki Ueno, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/097,625

(22) Filed: Dec. 5, 2013

(65) Prior Publication Data

US 2014/0162835 A1    Jun. 12, 2014

(30) Foreign Application Priority Data

Dec. 7, 2012  (JP) ................................. 2012-268185

(51) Int. Cl.
*B60K 1/02* (2006.01)
*B60W 20/00* (2006.01)
*B60W 30/20* (2006.01)

(52) U.S. Cl.
CPC ............... *B60W 20/10* (2013.01); *B60W 30/20* (2013.01); *Y02T 10/6239* (2013.01); *Y02T 10/7077* (2013.01); *Y10S 903/902* (2013.01); *Y10T 477/23* (2015.01)

(58) Field of Classification Search
CPC .............................. B60W 20/10; B60W 30/20
USPC ......... 477/3, 7, 2; 475/257; 180/65.265, 65.1; 192/70.17, 207, 200, 54.1, 66.1
See application file for complete search history.

(56) References Cited

U.S. PATENT DOCUMENTS

| | | | |
|---|---|---|---|
| 7,496,435 B2* | 2/2009 | Iwatsuki et al. | ................. 701/22 |
| 2004/0211640 A1* | 10/2004 | Fukushima | ................. 192/70.17 |
| 2004/0255904 A1* | 12/2004 | Izawa et al. | ................. 123/352 |
| 2013/0073136 A1* | 3/2013 | Yamamoto et al. | ............. 701/22 |

FOREIGN PATENT DOCUMENTS

| | | |
|---|---|---|
| JP | 2005-042560 A | 2/2005 |
| JP | 2006-029363 A | 2/2006 |
| JP | 2008-013041 A | 1/2008 |
| JP | 2010-167921 A | 8/2010 |

* cited by examiner

*Primary Examiner* — David J Hlavka
(74) *Attorney, Agent, or Firm* — Kenyon & Kenyon LLP

(57) ABSTRACT

A control device for a hybrid vehicle is equipped with an engine, an electric motor, and a damper that is interposed in a motive power transmission path between the engine and the electric motor. The control device is equipped with a hysteresis mechanism and a controller. The hysteresis mechanism is provided in the damper, is configured to have a characteristic that a hysteresis torque that is generated due to a twist of the damper, which transmits a driving force from the electric motor toward the engine, in a negative direction is larger than a hysteresis torque that is generated due to a twist of the damper, which transmits a driving force from the engine toward the electric motor, in a positive direction, and is configured to reduce an engine rotational speed by the electric motor in stopping the engine. The controller is configured to cause a torque, of the electric motor to be output such that the damper assumes a state of being twisted in the negative direction when a torque in such a direction as to drive the engine is applied from the electric motor in stopping the engine.

3 Claims, 7 Drawing Sheets

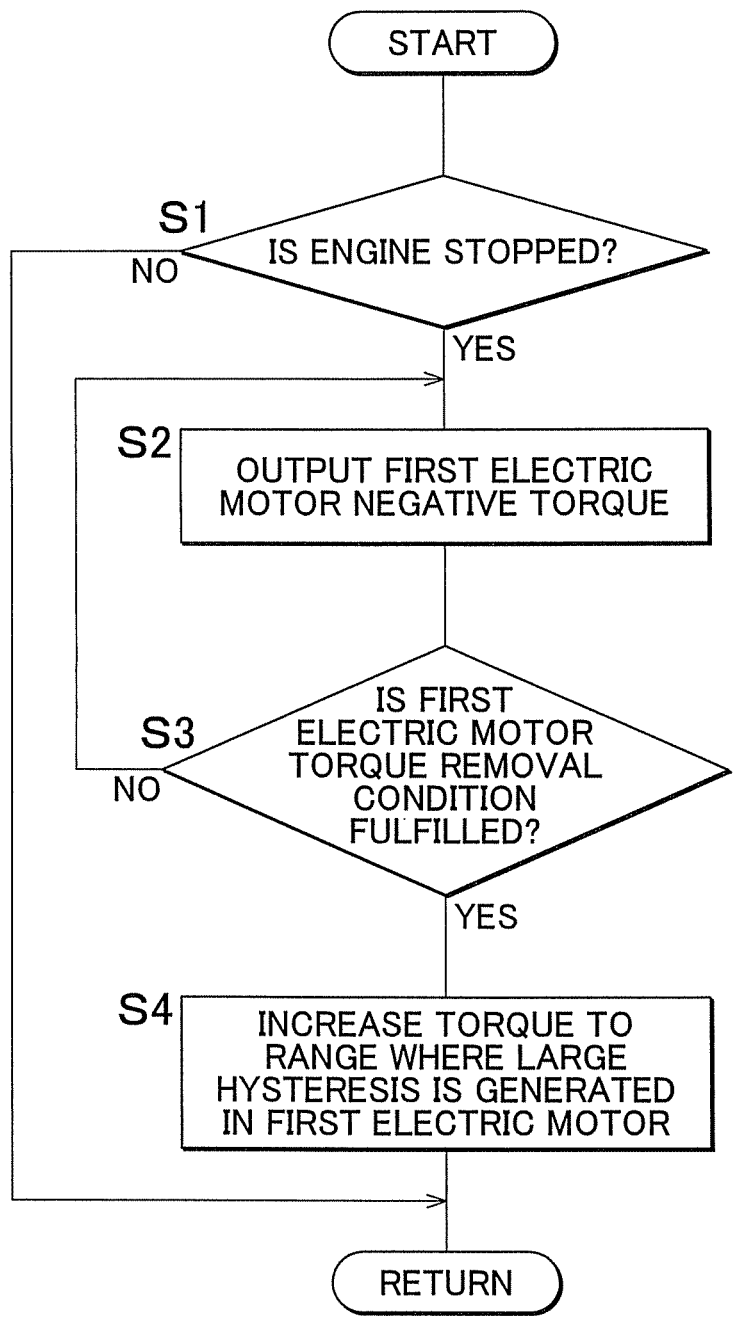

CONTROL DEVICE FOR HYBRID VEHICLE

INCORPORATION BY REFERENCE

The disclosure of Japanese Patent Application No. 2012-268185 filed on Dec. 7, 2012 including the specification, drawings and abstract is incorporated herein by reference in its entirety.

BACKGROUND OF THE INVENTION

1. Field of the Invention

The invention relates to a control device for a hybrid vehicle that is configured to include an engine, an electric motor, and a damper that is interposed in a motive power transmission path between the engine and the electric motor.

2. Description of Related Art

A hybrid vehicle that is configured to include an engine, an electric motor, and a damper that is equipped with a hysteresis mechanism in a motive power transmission path between the engine and the electric motor is well known. For example, a motive power transmission device described in Japanese Patent Application Publication No. 2006-29363 (JP-2006-29363 A) is also one such example. In a damper of Japanese Patent Application Publication No. 2006-29363 (JP-2006-29363 A), a large hysteresis torque is generated upon fluctuations of a twist angle in a negative-side twist range where a torque is transmitted from driving wheel sides. Thus, abrupt torque fluctuations that are caused in starting and stopping the engine are effectively damped. Besides, torque fluctuations during engine steady operation are effectively damped by generating a small hysteresis torque upon fluctuations in the twist angle in a positive-side twist range where a torque is transmitted from the engine side.

Besides, in a hybrid vehicle in general, the start and stop of an engine are frequently repeated. A plurality of control methods regarding the control of starting and stopping this engine have been proposed. For example, in a vehicular motive power transmission device described in Japanese Patent Application No. 2010-167921, a negative torque in such a direction as to reduce the rotational speed of an engine is output from an electric motor in stopping the engine, the torque is removed immediately before stop of the engine, and a positive torque in such a direction as to increase the rotational speed of the engine is slightly output to prevent reverse rotation of the engine.

By the way, it is known that if the negative torque of the electric motor that is output to reduce the rotational speed of the engine is removed immediately before the stop of rotation as in Japanese Patent Application No. 2010-167921 during stop control of the engine, the reactive force resulting from compression in a combustion chamber of the engine cannot be suppressed, the magnitude of torque fluctuations increases, and gear rattle noise is generated as a result of the torque fluctuations. Besides, the damper for the hybrid vehicle of Japanese Patent Application Publication No. 2006-29363 (JP-2006-29363 A) has a characteristic that a small hysteresis torque is generated if the relative twist angle is equal to or smaller than a predetermined value in a twist in a positive direction in which a torque is transmitted from the engine side. In a damper having a twist characteristic (a hysteresis characteristic) as in this Japanese . Patent Application Publication No. 2006-29363 (JP-2006-29363 A), in the case where engine stop control as in Japanese Patent Application No. 2010-167921 is performed, if the removal of the torque is started from a state where the torque of the electric motor is a negative torque, the range where the small hysteresis torque is generated is utilized. Besides, even if a positive torque is output from the electric motor, the value thereof is small. Therefore, the damper may be twisted in the positive direction upon vibrations thereof, and the small hysteresis torque is generated at that time. Accordingly, the torque fluctuations that are caused in stopping the engine cannot be effectively damped by the large hysteresis torque, and it is difficult to suppress gear rattle noise resulting from the torque fluctuations.

SUMMARY OF THE INVENTION

The invention has been made in view of the foregoing circumstances. In a hybrid vehicle that is configured to include an engine, an electric motor, and a damper that is interposed between the engine and the electric motor, there is provided a control device for the hybrid vehicle that can suppress gear rattle noise in stopping the engine.

Thus, according to one aspect of the invention, there is provided a control device for a hybrid vehicle that is equipped with an engine, an electric motor, and a damper that is interposed on a power transmission path between the engine and the electric motor. The control device is equipped with a hysteresis mechanism and a controller. The hysteresis mechanism is provided in the damper, is configured to have a characteristic that a hysteresis torque generated due to a twist of the damper in a negative direction in a case where the damper transmits a driving force from the electric motor toward the engine, is larger than a hysteresis torque generated due to a twist of the damper in a positive direction in a case where the damper transmits a driving force from the engine toward the electric motor, and the hysteresis mechanism is configured to reduce an engine rotational speed by the electric motor in stopping the engine. The controller is configured to cause a torque of the electric motor to be output such that the damper is twisted in the negative direction when a torque is supplied from the electric motor to the engine in a direction for driving the engine in stopping the engine.

In stopping the engine, if a negative torque is output from the electric motor to reduce the engine rotational speed and then is removed to prevent reverse rotation of the engine, a reactive force resulting from compression of the engine cannot be suppressed, and the magnitude of torque fluctuations increases. As a measure against this phenomenon, according to the control device for the hybrid vehicle as described above, a torque is output from the electric motor until the damper assumes a state of being twisted in the negative direction. Therefore, a range where the hysteresis torque is large can be utilized, and the magnitude of torque fluctuations can be effectively reduced by the hysteresis torque. Accordingly, the magnitude of torque fluctuations caused in stopping the engine can be reduced. Therefore, gear rattle noise generated at that time can be suppressed.

Besides, in the control device for the hybrid vehicle, a torque of the electric motor that causes the damper in a state of being twisted in the negative direction may be set to a value that ensures a twist greater than a twist resulting from torque fluctuations caused in stopping the engine. In this manner, in stopping the engine, the damper always assumes a state of being twisted in the negative direction. Therefore, the range where the hysteresis torque is large can be reliably utilized. Accordingly, torque fluctuations can be effectively damped by this hysteresis torque.

Besides, a magnitude of a torque at a time when the engine rotational speed is reduced by the electric motor may be changed in accordance with a magnitude of a torque output from the electric motor in a direction for driving the engine, in stopping the engine. In stopping the engine, if the magnitude of a torque that is output from the electric motor in a direction for driving the engine increases, it becomes difficult to stop the engine within a predetermined time. Thus, the torque output from the electric motor to reduce the engine rotational speed is changed in accordance with the torque output from the electric motor in a direction for driving the engine, whereby the engine rotational speed is swiftly reduced, and the engine can be stopped within a predetermined time.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein:

FIG. 10 is a flowchart for illustrating an essential part of control operation of an electronic control unit of FIG. 1, namely, control operation that makes it possible to reduce the generation of gear rattle noise in stopping an engine.

DETAILED DESCRIPTION OF EMBODIMENT

The embodiment of the invention will be described hereinafter in detail with reference to the drawings. In the following embodiment of the invention, the drawings are simplified or modified when appropriate, and the dimensional ratios, shapes and the like of respective portions are not necessarily depicted with accuracy. It should be noted herein that in the embodiment of the invention that will be described below, a twist of a damper, which transmits a driving force from an engine toward an electric motor, in a positive direction is treated as a twist at the time when a torque of the engine is transmitted to the electric motor side via the damper. The same twist also occurs in the case where the engine is stopped from the electric motor side, namely, a torque in such a direction as to reduce the engine rotational speed has been transmitted via the damper.

Besides, a twist of the damper, which transmits a driving force from the electric motor toward the engine, in a negative direction is treated as a twist at the time when the engine is driven from the electric motor, namely, a torque in such a direction as to increase the engine rotational speed is transmitted via the damper.

Figure 1:
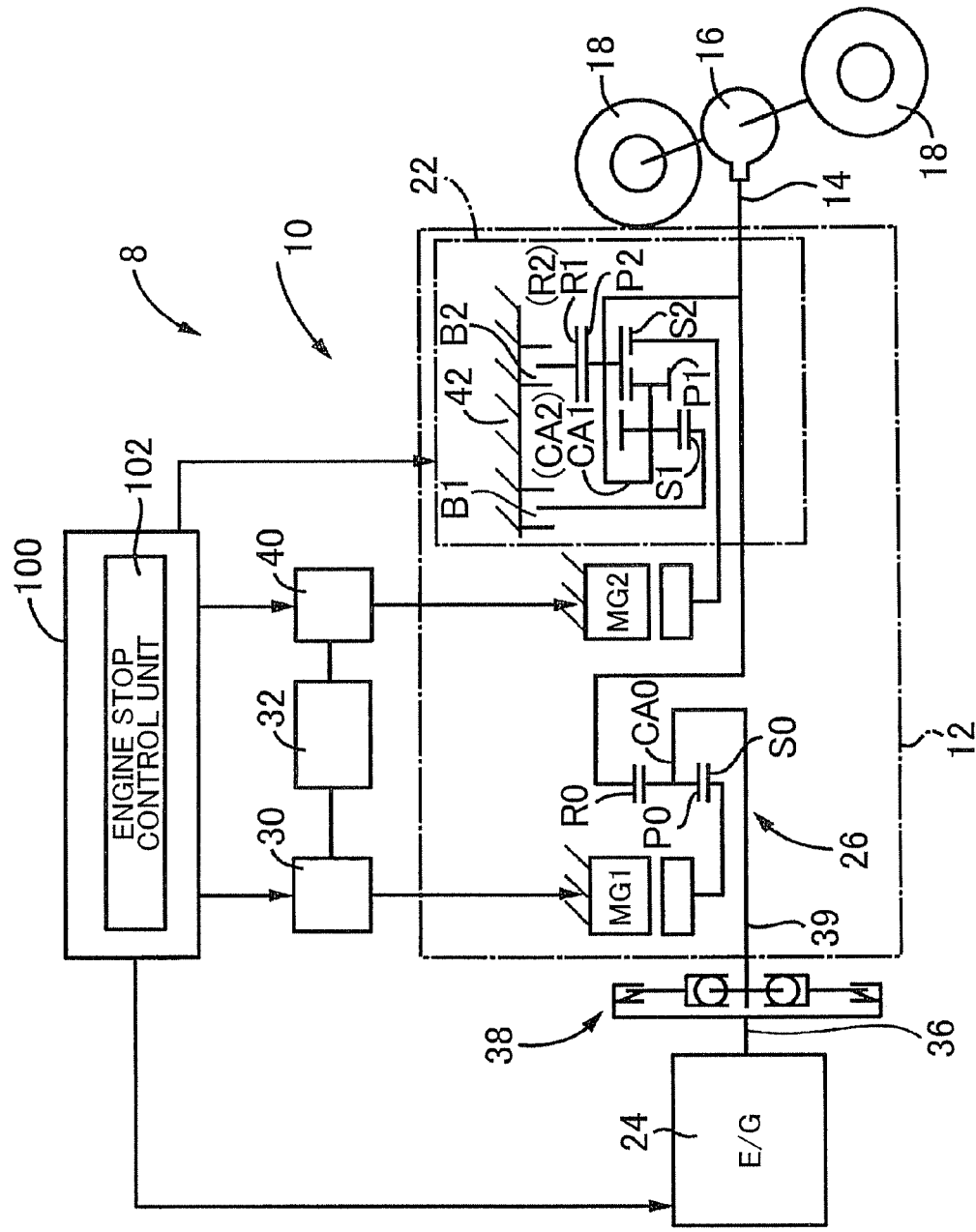
FIG. 1 is a main view illustrating a vehicular drive unit for a hybrid vehicle to which the invention is applied, and a schematic configurational view showing an essential part of a control system as well.

FIG. 1 is a schematic configurational view illustrating a vehicular drive unit 10 for a hybrid vehicle 8 to which the invention is applied. The vehicular drive unit 10 is configured to include an engine 24, a motive power transmission device 12, and a later-described damper 38 that is provided between the engine 24 and the motive power transmission device 12. Referring to FIG. 1, this vehicular drive unit 10 is designed such that in the vehicle, a torque of the engine 24 as a main driving source is transmitted to a wheel-side output shaft 14 via the damper 38 and a planetary gear train 26, which will be described later, and then is transmitted from the wheel-side output shaft 14 to a pair of right and left driving wheels 18 via a differential gear mechanism 16. Besides, this vehicular drive unit 10 is provided with a second electric motor MG2 that can selectively perform power running control for outputting a driving force for running and regeneration control for recovering energy. This second electric motor MG2 is coupled to the aforementioned wheel-side output shaft via an automatic transmission 22. Accordingly, an output torque that is transmitted from the second electric motor MG2 to the wheel-side output shaft is increased or reduced in accordance with a speed ratio γs that is set in the automatic transmission 22 (=a rotational speed Nmg2 of the second electric motor MG2/a rotational speed Nout of the wheel-side output shaft).

The automatic transmission 22 that is interposed in a motive power transmission path between the second electric motor MG2 and the driving wheels 18 is configured such that a plurality of gear stages with the speed ratio γs larger than "1" can be established. During power running in which a torque is output from the second electric motor MG2, the torque can be increased and transmitted to the wheel-side output shaft. Therefore, the second electric motor MG2 is configured with an even lower capacity or in an even smaller size. Thus, if the rotational speed Nout of the wheel-side output shaft increases as a result of, for example, a high vehicle speed, the speed ratio γs is reduced to reduce the rotational speed of the second electric motor MG2 (hereinafter referred to as a second electric motor rotational speed) Nmg2, with a view to holding the operation efficiency of the second electric motor MG2 in a good condition. Besides, if the rotational speed Nout of the wheel-side output shaft decreases, the speed ratio γs is increased to increase the second electric motor rotational speed Nmg2.

The aforementioned motive power transmission device 12 is configured to be equipped with the first electric motor MG1 and the second electric motor MG2, and transmits a torque of the engine 24 to the driving wheels 18. The aforementioned engine 24 is a known internal combustion engine that burns fuel for a gasoline engine, a diesel engine or the like and outputs a motive power, and is configured such that the operation state such as a throttle valve opening degree, an intake air amount, a fuel supply amount, an ignition timing and the like is electrically controlled by an electronic control unit (an E-ECU) for engine control (not shown), which is mainly constituted of a microcomputer. Detection signals from an accelerator operation amount sensor AS that detects an operation amount of an accelerator pedal, a brake sensor BS for detecting whether or not a brake pedal has been operated, and the like are supplied to the aforementioned electronic control unit.

The aforementioned first electric motor MG1 (the electric motor) is, for example, a synchronous electric motor, and is configured to selectively create a function as an electric motor that generates a drive torque Tm1 and a function as an electric generator. The first electric motor MG1 is connected to an electric storage device 32 such as a battery, a capacitor or the like, via an inverter 30. In addition, the inverter 30 is controlled by an electronic control unit (an MG-ECU) for motor-generator control (not shown), which is mainly constituted of a microcomputer, whereby an output torque Tm1 or a regenerative torque Tm1 of the first electric motor MG1 is adjusted or set. Incidentally, the first electric motor MG1 corresponds to the electric motor of the invention.

The planetary gear train 26 is a single pinion-type planetary gear mechanism that is equipped with a sun gear S0, a ring gear R0 and a carrier CA0 as three rotary elements to cause a known differential effect. The ring gear R0 is arranged concentrically with the sun gear S0. The, carrier CA0 supports a pinion gear P0 that meshes with this sun gear S0 and this ring gear R0, such that the pinion gear P0 can rotate around its own axis and around the carrier CA0. The planetary gear train 26 is provided concentrically with the engine 24 and the automatic transmission 22. Each of the planetary gear train 26 and the automatic transmission 22 is configured symmetrically with respect to a centerline, and hence the lower half thereof is omitted in FIG. 1.

In the embodiment of the invention, a crankshaft 36 of the engine 24 is coupled to the carrier CAO of the planetary gear train 26 via the damper 38 and the motive power transmission shaft 39. On the other hand, the first electric motor MG1 is coupled to the sun gear S0, and the wheel-side output shaft is coupled to the ring gear R0. This carrier CA0 functions as an input element, the sun gear S0 functions as a reactive force element, and the ring gear R0 functions as an output element.

In the aforementioned planetary gear train 26, if a reactive torque Tm1 generated by the first electric motor MG1 is input to the sun gear S0 in response to an output torque of the engine 24 that is input to the carrier CA0, a direct delivery torque appears in the ring gear R0 as an output element. Therefore, the first electric motor MG1 functions as an electric generator. Besides, when the rotational speed of the ring gear R0, namely, the rotational speed of the wheel-side output shaft 14 (an output shaft rotational speed) Nout is constant, the rotational speed Nmg1 of the first electric motor MG1 is changed to be increased or reduced, whereby a rotational speed of the engine 24 (the engine rotational speed) Ne can be continuously (steplessly) changed.

The automatic transmission 22 according to the embodiment of the invention is constituted of a pair of Ravigneaux-type planetary gear mechanisms. That is, the automatic transmission 22 is provided with a first sun gear Si and a second sun gear S2, a large-diameter portion of a stepped pinion P1 meshes with the first sun gear S1, a small-diameter portion of the stepped pinion P1 meshes with a pinion P2, and the pinion P2 meshes with a ring gear R1 (R2) that is arranged concentrically with each of the sun gears Si and S2. Each of the aforementioned pinions P1 and P2 is retained by a common carrier CA1 (CA2) in a manner rotatable around its own axis and around the carrier CA1 (CA2). Besides, the second sun gear S2 meshes with the pinion P2.

The second electric motor MG2 (an electric motor) is caused to function as an electric motor or an electric generator by being controlled by the electronic control unit for motor-generator control (an MG-ECU) via an inverter 40, so that an assist output torque or a regenerative torque is adjusted or set. The second electric motor MG2 is coupled to the second sun gear S2, and the aforementioned carrier CA1 is coupled to the wheel-side output shaft. The first sun gear S1 and the ring gear R1 constitute, together with the respective pinions P1 and P2, a mechanism equivalent to a double pinion-type planetary gear train. Besides, the second sun gear S2 and the ring gear R1 constitute, together with the pinion P2, a mechanism equivalent to a single pinion-type planetary gear train.

In addition, the automatic transmission 22 is provided with a first brake B1 that is provided between the first sun gear S1 and a housing 42 as a non-rotary member to selectively fix the first sun gear S1, and a second brake B2 that is provided between the ring gear R1 and the housing 42 to selectively fix the ring gear R1. Each of these brakes B1 and B2 is a so-called frictional engagement device that generates a braking force through the use of a frictional force, and can adopt a multi-disc-type engagement device or a band-type engagement device. In addition, each of these brakes B1 and B2 is configured such that the torque capacity thereof continuously changes in accordance with an engagement pressure that is generated by a corresponding one of a brake B1 hydraulic actuator and a brake B2 hydraulic actuator, which are hydraulic cylinders or the like respectively.

The automatic transmission 22 configured as described above is configured such that the second sun gear S2 functions as an input element, that the carrier CA1 functions as an output element, that a high shift speed H with a speed ratio γsh larger than "1" is established if the brake B1 is engaged, and that a low shift speed L with a speed ratio γs1 larger than the speed ratio γsh of the high shift speed H is established if the second brake B2 is engaged instead of the first brake B1. That is, the automatic transmission 22 is a two-staged transmission, and shifting between these shift speeds H and L is carried out on the basis of a running state such as a vehicle speed V, a required driving force (or an accelerator operation amount) or the like. More specifically, shift speed ranges are determined in advance as a map (a shift diagram), and control is performed in such a manner as to set one of the shift speeds in accordance with a detected operation state.

Figure 2:
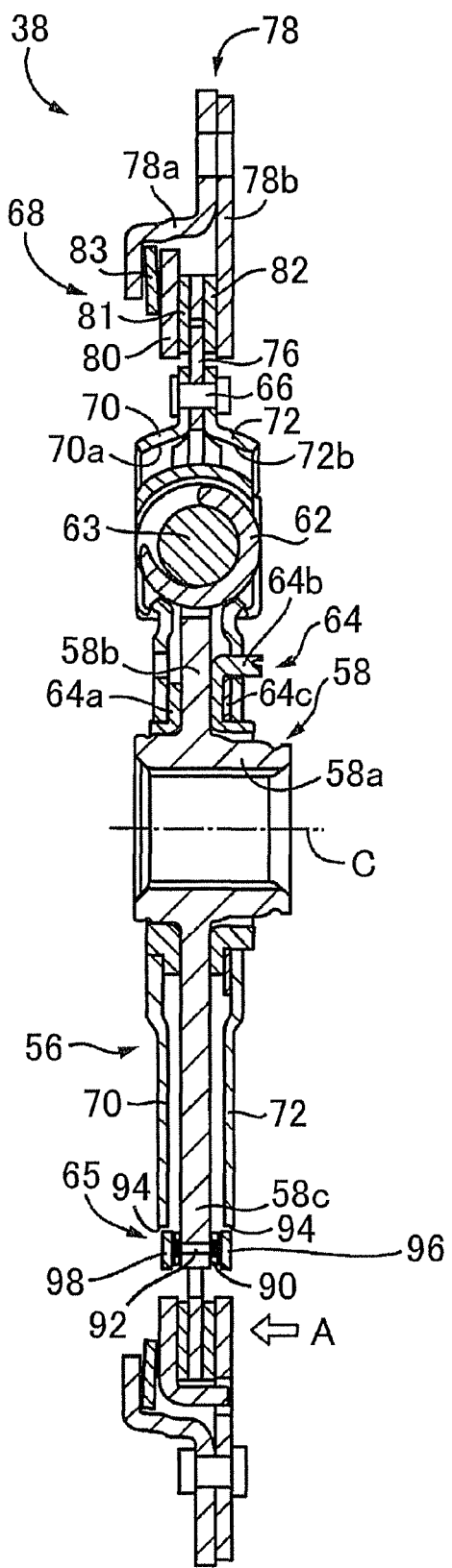
FIG. 2 is a cross-sectional view for illustrating the configuration of a damper device shown in FIG. 1 in detail.

FIG. 2 is a cross-sectional view for illustrating the configuration of the damper 38 shown in FIG. 1 in detail. The damper 38 is provided between the engine 24 and the planetary gear train 26 around an axis of rotation C, such that a motive power can be transmitted. Incidentally, a motive power transmission shaft 39 shown in FIG. 1 is spline-fitted in an inner peripheral portion of the damper 38. Incidentally, the first electric motor MG1 is coupled to the damper 38 via the planetary gear train 26, such that a motive power can be transmitted. Therefore, the damper 38 is interposed in a motive power transmission path between the engine 24 and the first electric motor MG1.

The damper 38 is configured to include a pair of disc plates 56, a hub 58, coil springs 62, cushions 63, a first hysteresis mechanism 64, a second hysteresis mechanism 65, and a torque limiter mechanism 68. The disc plates 56 can rotate around the axis of rotation C. The hub 58 can rotate around the axis of rotation C relatively to the disc plates 56. The coil springs 62 are interposed between the disc plates 56 and the hub 58, couples the disc plates 56 and the hub 58 to each other such that a motive power can be transmitted, and is made of spring steel. The cushions 63 are incorporated in the coil springs 62 respectively. The first hysteresis mechanism 64 generates a small hysteresis torque H1 between the disc plates 56 and the hub 58. The second hysteresis mechanism 65 is provided at an outer peripheral end of the hub 58, and generates a hysteresis torque H2 larger than the small hysteresis torque H1 between the disc plates 56 and the hub 58. The torque limiter mechanism 68 is provided on an outer peripheral side of the disc plates 56. Incidentally, the first hysteresis mechanism 64 and the second hysteresis mechanism 65 constitute the hysteresis mechanism of the invention.

The disc plates 56 are constituted by a pair of right and left discoid plates, namely, a first, disc plate 70 (hereinafter the first plate 70) and a second disc plate 72 (hereinafter the second plate 72), and outer peripheral portions thereof are fastened to each other by a rivet 66 such that relative rotation therebetween is impossible, with the coil springs 62 and the hub 58 sandwiched by the plates 70 and 72 in an axial direction. Incidentally, the rivet 66 also functions as a fastening member for a lining plate 76 as a component of the torque limiter mechanism 68, which will be described later. A plurality of first opening holes 70a for accommodating the coil springs 62 are formed through the first plate 70 in a circumferential direction thereof. Besides, a plurality of opening holes 72a for accommodating the coil springs 62 are formed through the second plate 72 as well in a circumferential direction thereof, at positions corresponding to the first opening holes 70a respectively. In addition, a plurality of the coil springs 62 are accommodated at equal angular intervals in a space that is formed by the first opening holes 70a and the second opening holes 72a. Thus, if the disc plates 56 rotate around the axis of rotation C, the coil springs 62 are also caused to rotate around the axis of rotation C in a similar manner.

Besides, the columnar cushions 63 are incorporated in the coil springs 62 respectively.

The hub 58 is constituted of a cylinder portion 58a, a circular plate-like flange portion 58b, and a plurality of protrusion portions 58c. The cylinder portion 58a is equipped, in an inner peripheral portion thereof, with inner peripheral teeth to which the motive power transmission shaft 39 is spline-fitted. The flange portion 58b extends radially outward from an outer peripheral face of the cylinder portion 58a. The protrusion portions 58c protrude radially further outward from the flange portion 58b. In addition, the coil springs 62 are interposed in spaces that are formed among the respective protrusion portions 58c in a rotational direction. Thus, if the hub 58 rotates around the axis of 15. rotation C, the coil springs 62 are also caused to rotate around the axis of rotation C in a similar manner. By being thus configured, the coil springs 62 transmit a motive power while being elastically deformed in accordance with an amount of relative rotation between the members of the disc plates 56 and the hub 58. For example, if the disc plates 56 rotate, one end of each of the coil springs 62 is pressed, and the other end of each of the coil springs 62 presses a corresponding one of the protrusion portions 58c of the hub 58, so that the hub 58 is rotated. At this time, the coil springs 62 transmit a motive power while being elastically deformed, whereby a shock resulting from torque fluctuations is absorbed by the coil springs 62.

The first hysteresis mechanism 64 is provided between the disc plates 56 and the flange portion 58b of the hub 58 in the axial direction, on the inner peripheral side of the coil springs 62. In addition, the hysteresis mechanism 64 is configured to include a first member 64a, a second member 64b, and a disc spring 64c. The first member 64a is interposed between the first plate 70 and the flange portion 58b. The second member 64b is interposed between the second plate 72 and the flange portion 58b. The disc spring 64c is interposed in a preloaded state between the second member 64b and the second plate 72, and presses the second member 64b toward the flange portion 58b side. Incidentally, part of the first member 64a is fitted in a notch that is formed in the first plate 70, whereby the first member 64a and the first plate 70 are prevented from rotating relatively to each other. Besides, part of the second member 64b is fitted in a notch that is formed in the second plate 72, whereby the second member 64b and the second plate 72 are prevented from rotating relatively to each other. In the first hysteresis mechanism 64 configured as described above, when the hub 58 slides with respect to the disc plates 56, a hysteresis torque is generated due to the generation of a frictional force between the flange portion 58b on the one hand and the first plate 70 and the second plate 72 on the other hand.

Incidentally, the first hysteresis mechanism 64 is designed such that a relatively small hysteresis torque H1 (a small hysteresis) is generated in a positive-side twist angle range and a negative-side twist angle range. This small hysteresis torque H1 is advantageous in damping torsional vibrations with a relatively small amplitude, which are caused during idle operation or steady operation of the engine.

The torque limiter mechanism 68 is provided on the outer peripheral side of the disc plates 56, and has a function of preventing the transmission of a torque exceeding a preset limit torque Tlm. The torque limiter mechanism 68 is configured to include an annular plate-like lining plate 76, a support plate 78, an annular plate-like pressure plate 80, a first frictional material 81, a second frictional material 82, and a conical disc spring 83. The lining plate 76 rotates together with the disc plates 56 by being fastened by the rivet 66 together with the disc plates 56. The support plate 78 is arranged on the outer peripheral side, and can rotate around the axis of rotation C. The pressure plate 80 is arranged on the inner peripheral side of the support plate 78, and can rotate around the axis of rotation C. The first frictional material 81 is interposed between the pressure plate 80 and the lining plate 76. The second frictional material 82 is interposed between the lining plate 76 and the support plate 78. The disc spring 83 is interposed in a preloaded state between the pressure plate 80 and the support plate 78.

The support plate 78 is constituted of a discoid first support plate 78a and a circular plate-like second support plate 78b. Bolt holes for bolt fastening (not shown) for fixing a flywheel (not shown) to the support plates 78a and 78b are formed through an outer peripheral portion of the support plate 78 respectively. An inner peripheral portion of the first support plate 78a is axially flexed, so that a space is formed between the first support plate 78a and the second support plate 78b. In this space, the disc spring 83, the pressure plate 80, the first frictional material 81, the lining plate 76, and the second frictional material 82 are accommodated in this order in the axial direction from the first support plate 78a toward the second support plate 78b.

The lining plate 76 is an annular plate-like member whose inner peripheral portion is fixed together with the first plate 70 and the second plate 72 by the rivet 66.

Besides, the pressure plate 80 is also formed in a similar manner in the shape of an annular plate. The first frictional material 81 is interposed between this pressure plate 80 and the lining plate 76. The first frictional material 81 is formed in the shape of, for example, an annular plate. Alternatively, the first frictional material 81 may be formed in the shape of circular arcs (in the shape of pieces), and these pieces may be arranged at equal angular intervals in the circumferential direction. Incidentally, this first frictional material 81 is stuck to the lining plate 76 side, but may be stuck to the pressure plate 80 side.

Besides, the second frictional material 82 is interposed between the inner peripheral portion of the second support plate 78b and the lining plate 76. The second frictional material 82 is formed in the shape of, for example, an annular plate, as is the case with the first frictional material 81. Alternatively, the second frictional material 82 may be formed in the shape of circular arcs (in the shape of pieces), and these pieces may be arranged at equal angular intervals in the circumferential direction. Incidentally, this second frictional material 82 is stuck to the lining plate 76 side, but may be stuck to the second support plate 78b side.

The disc spring 83 is interposed in a preloaded state between the first support plate 78a and the pressure plate 80. The disc spring 83 is conically formed, has an inner peripheral end abutting on the pressure plate 80 and an outer peripheral end abutting on the first support plate 78a, and is interposed after being deformed to such a flexure amount as to cause the preload (a disc spring load W). Accordingly, the disc spring 83 axially presses the pressure plate 80 toward the lining plate 76 side with the disc spring load W. Then, the limit torque Tlm is set to a target value by adjusting a friction coefficient p. of a friction surface between the pressure plate 80 and the first frictional material 81 and a friction surface between the second support plate 78b and the second frictional material 82, an operation radius r of the frictional materials 81 and 82, and the disc spring load W of the disc spring 83. Then, if a torque exceeding the limit torque Tlm is input to the torque limiter mechanism 68, slippage occurs on the frictional surface between the pressure plate 80 and the first frictional material 81, and on the frictional surface between the second support plate 78b and the second frictional material 82. As a result, the transmission of a torque exceeding the limit torque Tlm is prevented.

Figure 3:
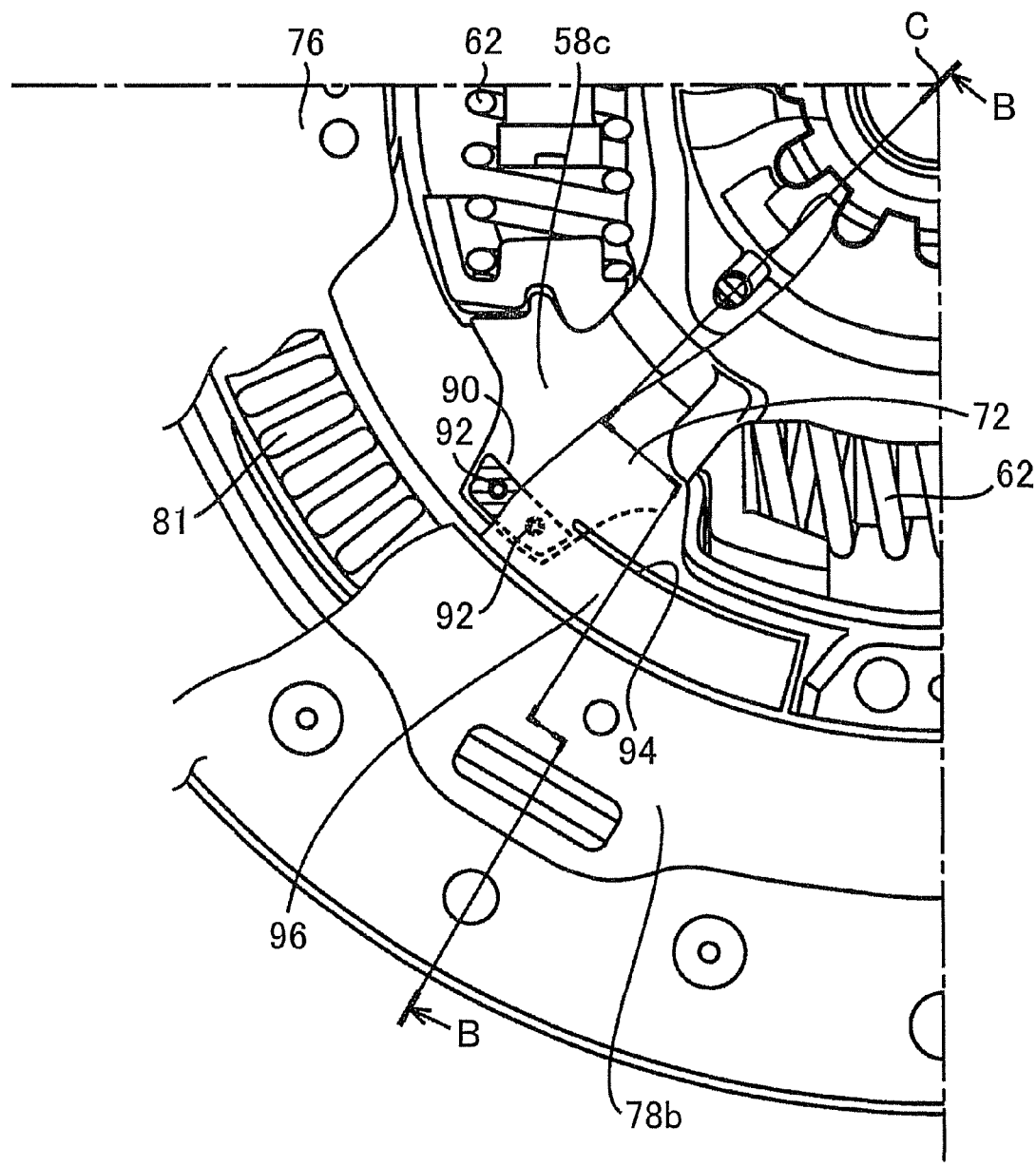
FIG. 3 is a partially cut-away A-arrow view of the damper device of FIG. 2 as viewed from the direction of an arrow A.

The second hysteresis mechanism 65 is a mechanism that is provided at outer peripheral portions of the hub 58 and the disc plates 56, and generates sliding resistance (a frictional force) therebetween to generate the hysteresis torque H2 larger than the small hysteresis torque H1 generated by the first hysteresis mechanism 64. Besides, FIG. 3 is a partially cut-away A-arrow view of the damper 38 of FIG. 2 as viewed from the direction of an arrow A. Besides, part of FIG. 3 is represented as a perspective view. As shown in FIGS. 2 and 3, on both faces substantially parallel to the disc plates 56 on the outer peripheral sides of the protrusion portions 58c of the hub 58, rectangular (piece-shaped) friction plates 90 that are made of, for example, a resin material or the like are fixed by rivets 92 respectively.

Besides, as shown in FIG. 3, an L-shaped notch 94 is formed in the second plate 72. The notch 94 extends from an outer peripheral end of the second plate 72 toward an inner peripheral side, and is further formed from the inner peripheral portion along the circumferential direction (the rotational direction). Due to the formation of this notch 94, a fan-shaped cantilever portion 96 that is parallel to the rotational direction is formed on the second plate 72. The cantilever portion 96 is formed at the same radial position as a region where the friction plates 90 of the protrusion portions 58c are fixed. Furthermore, the cantilever portion 96 is formed in a tapered manner with a predetermined gradient S toward the hub 58 side (the friction plate 90 sides) along the rotational direction. Accordingly, if the hub 58 and the second plate 72 rotate relatively to each other, the friction plates 90 and the cantilever portion 96 abut on each other and start to slide, as the coil springs 62 are compressed. Incidentally, although not shown in FIG. 3, a cantilever portion 98 that is formed in a shape similar to that of the second plate 72 is formed on the first plate 70 shown in FIG. 2 as well.

Figure 4:
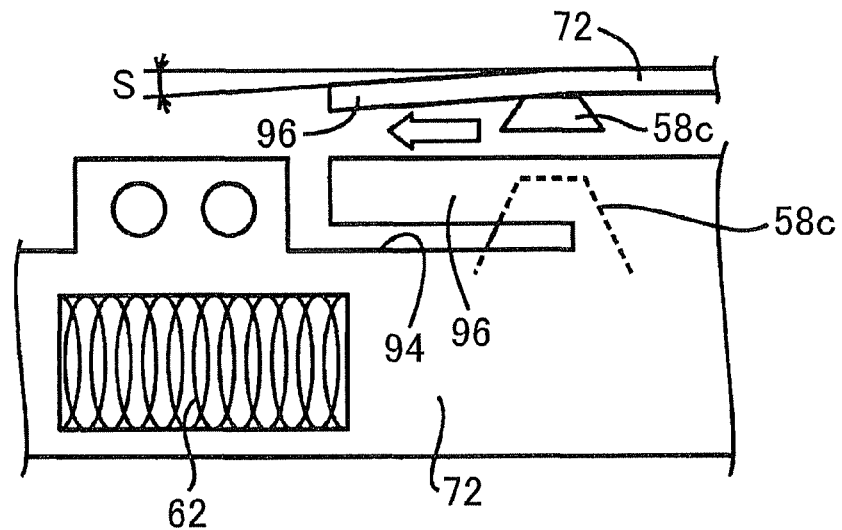
FIG. 4 is a view showing, in a more simplified manner, especially the periphery of a cantilever portion of a second plate in the damper device of FIG. 3.

FIG. 4 is a view showing, in a more simplified manner, especially the periphery of the cantilever portion 96 of the second plate 72 in the damper 38 of FIG. 3. Incidentally, the second plate 72 actually has a discoid shape, but FIG. 4 is a view in which the second plate 72 is rectilinearly deployed. Accordingly, by the same token, the protrusion portions 58c of the hub 58, which are indicated by broken lines, also actually rotate around the axis of rotation C, but move rectilinearly (in the lateral direction in FIG. 4) in FIG. 4. Besides, a view shown in the upper portion of FIG. 4 is a lateral view of the cantilever portion 96 and the protrusion portions 58c, which are shown below. Incidentally, the friction plates 90 that are fixed to the protrusion portions 58c are omitted in FIG. 4.

As is also apparent from the lateral view of FIG. 4, the cantilever portion 96 is inclined with a predetermined gradient S. Accordingly, if the, protrusion portions 58c (the hub 58) and the second plate 72 are rotated relatively to each other and the protrusion portions 58c come into abutment on the cantilever portion 96, the protrusion portions 58c and the second plate 72 are slid with respect to each other. Specifically, if the protrusion portions 58c move leftward relatively to the second plate 72 in FIG. 4, the protrusion portions 58c and the cantilever portion 96 come into abutment on each other in association with the formation of the cantilever portion 96 in a tapered manner, and are slid with respect to each other while the hub 58 presses the cantilever portion 96 as the twist angle θ changes. Incidentally, although the cantilever portion 96 of the second plate 72 is shown in FIGS. 3 and 4, the cantilever portion 98 of the first plate 70 is also slid in a similar manner.

In this manner, if the protrusion portions 58c and the cantilever portions 96 and 98 are slid with respect to each other respectively, a frictional force is generated between the friction plates 90, which are fixed to the protrusion portions 58c respectively, and the cantilever portions 96 and 98 respectively, and the hysteresis torque H2 corresponding thereto is generated. That is, the cantilever portions 96 and 98 have the functions of both a disc spring and a sliding member in a conventional hysteresis mechanism. This hysteresis torque H2 is set to the target hysteresis torque H2 by adjusting the board thicknesses of the friction plates 90 and the hub 58, the clearance between the first plate 70 and the second plate 72, the shape of the notches formed in the first plate 70 and the second plate 72, the gradient S (a tapered angle) of the cantilever portions 96 and 98 of the first plate 70 and the second plate 72, and the like to adjust the pressing load applied to the friction plates 90. Besides, the second hysteresis mechanism 65 is arranged on the outer peripheral side in the radial direction with respect to the first hysteresis mechanism 64. Therefore, the hysteresis torque H2 that is larger than the small hysteresis torque H1 can be generated. Incidentally, the twist angle θ at which the generation of the hysteresis torque H2 begins can also be appropriately adjusted by adjusting the shape of the notches and the gradient S of the cantilever portions 96 and 98.

It should be noted herein that the second hysteresis mechanism 65 of this embodiment of the invention is set such that the hysteresis torque H2 is generated in the case where a torque (a driving force) in such a direction as to drive the engine 24 (in such a direction as to increase the rotational speed of the engine) has been transmitted from the driving wheel sides (the first electric motor side) toward the engine 24, namely, the damper 38 has been twisted in the negative direction (toward the negative side). That is, the friction plates 90 are set in such a manner as to slide with respect to the cantilever portions 96 and 98 when a torque in such a direction as to drive the engine has been transmitted from the driving wheel sides (the first electric motor side). On the other hand, the friction plates 90 and the cantilever portions 96 and 98 are set in such a manner as not to slide with respect to each other respectively in the case where the damper 38, to which a torque (a driving force) is transmitted from the engine side, has been twisted in the positive direction (toward the positive side).

For example, in FIG. 3, if the hub 58 is set in such a manner as to rotate counterclockwise (such that the protrusion portions 58c move leftward in FIG. 4) when a torque is transmitted from the driving wheel sides (in the negative-side twist angle range), the cantilever portion 96 and the friction plates 90 are slid with respect to each other as the twist angle θ changes. On the other hand, if the hub 58 is set in such a manner as to rotate clockwise in FIG. 3 (such that the protrusion portions 58c move rightward in FIG. 4) when a torque is transmitted from the engine side (in the positive-side twist angle range), the friction plates 90 move away from the cantilever portion 96. Therefore, even if the twist angle θ changes, the cantilever portion 96 and the friction plates 90 do not slide with respect to each other. Accordingly, in the twist angle range in the positive direction (on the positive side) of the damper 38 where a torque (a driving force) is transmitted from the engine side toward the driving wheel sides, the hysteresis torque H2 is not generated by the second hysteresis mechanism 65. In the twist angle range in the negative direction (on the negative side) of the damper 38 where a torque in a driving direction (a driving force) is transmitted from the driving wheel sides toward the engine 24, the hysteresis torque H2 is generated by the second hysteresis mechanism 65.

Figure 5:
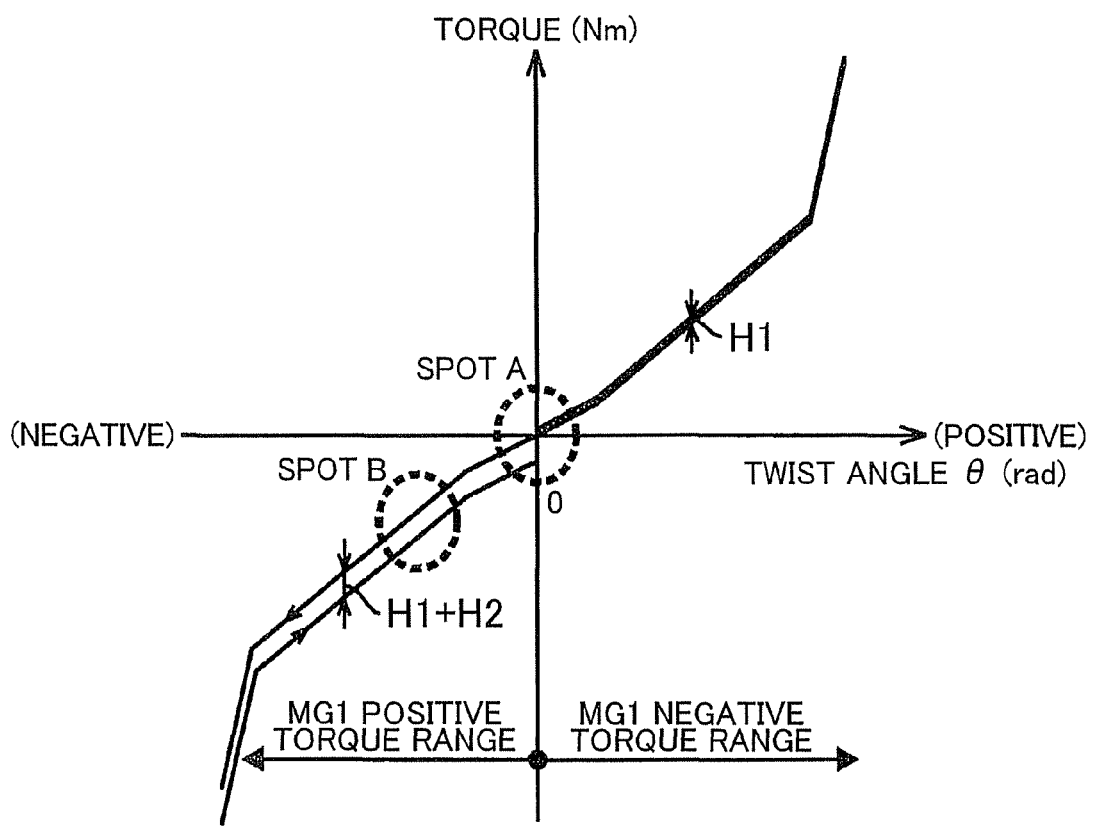
FIG. 5 is a view showing a twist characteristic of the damper device of FIG. 2.

FIG. 5 shows a twist characteristic of the damper 38 according to this embodiment of the invention. Incidentally, the axis of abscissa represents the twist angle θ (rad), and the axis of ordinate represents a torque (Nm). As shown in FIG. 5, in a twist angle range where the twist angle θ is in the positive direction (on the positive side), namely, a torque (a driving force) is transmitted from the engine side, the small hysteresis torque H1 is generated. As described above, this is because only the first hysteresis mechanism 64 operates and the second hysteresis mechanism 65 does not operate. On the other hand, in the twist angle range where the twist angle θ is on the negative side, namely, a torque applied to the engine drive side is transmitted from the driving wheel sides, the second hysteresis mechanism 65 operates. Therefore, a large hysteresis torque (H1+H2) as a sum of the small hysteresis torque H1 and the hysteresis torque H2 is generated.

Figure 6:
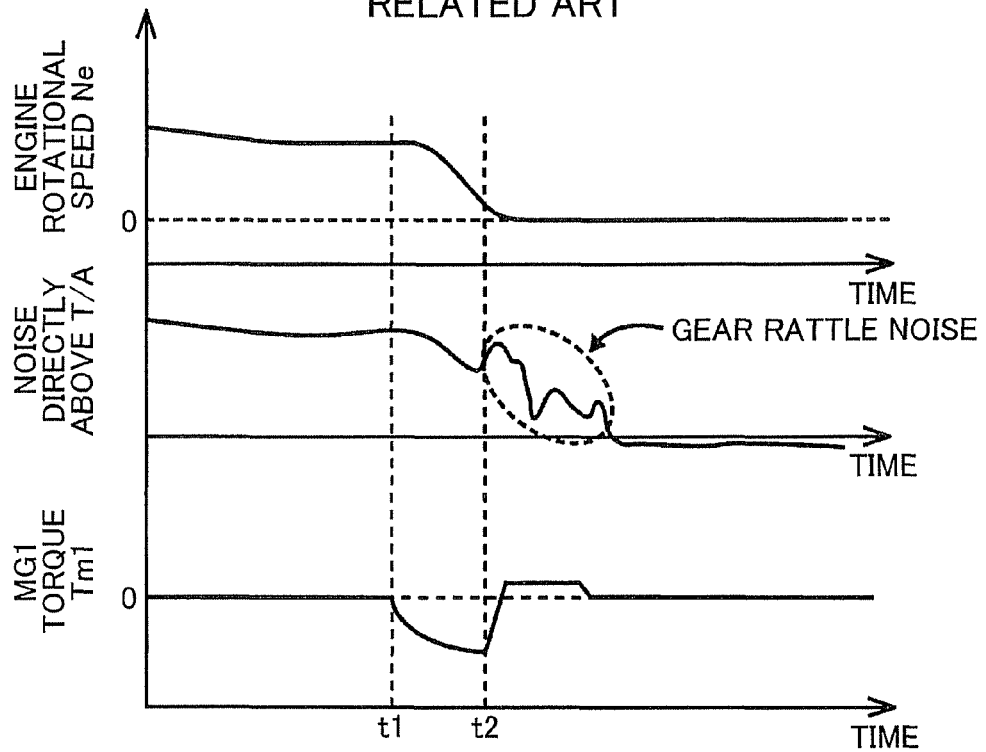
FIG. 6 includes time charts showing an operation state at the time when conventionally performed engine stop control is performed.

In the hybrid vehicle 8 that is equipped with the damper 38 configured as described above, when the engine 24 is stopped, engine stop control by the first electric motor MG1 is performed. Specifically, if it is determined that the engine 24 should be stopped, a negative torque Tm1 is output from the first electric motor MG1, whereby a torque for stopping the engine 24 is transmitted via the damper 38 due to the differential effect of the planetary gear train 26. Accordingly, the engine rotational speed Ne decreases. Then, immediately before the stop of the engine 24, control for removing the negative torque Tm1 that is output from the first electric motor MG1 is performed to prevent reverse rotation of the engine 24. FIG. 6 includes time charts showing an operation state of the engine rotational speed Ne and the torque Tm1 of the first electric motor MG1 (the MG1 torque) at the time when conventionally performed engine stop control is performed. Referring to FIG. 6, if it is determined that the engine 24 should be stopped at a time point t1, the negative torque Tm1 is output from the first electric motor MG1, whereby a torque in such a direction as to stop the engine 24 is transmitted to the engine 24 due to a differential effect of the planetary gear train 26, and the engine rotational speed Ne decreases. Then, at a time point t2 when the engine rotational speed Ne becomes equal to or lower than a predetermined value, the removal of the negative torque Tm1 of the first electric motor MG1 is started, and the torque Tm1 of the first electric motor MG1 is increased to a positive value in the vicinity of zero. If the torque is thus removed, the reactive force resulting from compression in the combustion chamber of the engine 24 cannot be suppressed, the magnitude of torque fluctuations increases, and gear rattle noise is generated in the motive power transmission device 12. Incidentally, in this embodiment of the invention, the negative torque Tm1 of the first electric motor MG1 is a torque that is applied reversely to the engine rotational direction, and the positive torque Tm1 of the first electric motor MG1 is a torque that is applied in the same direction as engine rotation.

It should be noted herein that when the first electric motor MG1 outputs the negative torque Tm1, a torque that reduces the engine rotational speed Ne is transmitted from the driving wheel sides (the first electric motor side) to the damper 38, so that the damper 38 assumes a state of being twisted in the same positive direction (on the positive side) as in the state in which a driving force in a driving direction is transmitted from the engine 24 toward the driving wheel sides. That is, the twist angle θ of the damper 38 is in the positive range. Accordingly, the twist angle θ of the damper 38 is in the range where the small hysteresis torque H1 shown in FIG. 5 is generated. On the other hand, when the first electric motor MG1 outputs the positive torque Tm1, a torque that increases the engine rotational speed Ne from the driving wheel sides (the first electric motor side) toward the engine 24 is transmitted to the damper 38, and hence the damper 38 assumes a state of being twisted in the negative direction (on the negative side). That is, the twist angle θ of the damper 38 assumes a negative value. Accordingly, the twist angle θ of the damper 38 is in the range where the large hysteresis torque (H1+H2) shown in FIG. 5 is generated.

Thus, at and after the time point t2 of FIG. 6, the removal of the negative torque of the first electric motor MG1 starts to make a changeover to a positive torque. At this time, the operation range of the hysteresis torque is a spot A shown in FIG. 5. Incidentally, even if the torque Tm1 of the first electric motor MG1 is changed over to a positive torque, the value thereof is small. Therefore, if the damper 38 is greatly twisted due to torque fluctuations, the damper 38 may assume a state of being twisted in the positive direction (on the positive side), and the small hysteresis torque may be generated in that case. Thus, if the removal of the torque Tm1 of the first electric motor MG1 is started during stop of the engine, the magnitude of torque fluctuations increases, but the large hysteresis torque (H1+H2) cannot be generated at this time, so that it is difficult to damp these torque fluctuations by the large hysteresis torque. Accordingly, there is a problem in that it is difficult to suppress gear rattle noise as shown at and after the time point t2 of FIG. 6, which is generated as a result of these torque fluctuations.

Thus, in this embodiment of the invention, the torque Tm1 of the first electric motor MG1 is controlled in stopping the engine, and the range of a spot B shown in FIG. 5 is used. Thus, the large hysteresis torque (H1+H2) is reliably generated to reduce the magnitude of torque fluctuations and suppress gear rattle noise.

Referring back to FIG. 1, the electronic control unit 100 is configured to include, for example, a so-called microcomputer that is equipped with a CPU, a RAM, a ROM, input/output interfaces and the like. The CPU performs a signal processing according to a program stored in advance in the ROM while utilizing a temporary storage function of the RAM, thereby performing various kinds of control of the vehicle 8. For example, the electronic control unit 100 performs output control of the engine 24, drive control and regenerative control of the first electric motor MG1 and the second electric motor MG2, shift control of the automatic transmission 22, and the like, and is configured separately for engine control, electric motor control, hydraulic control (shift control) and the like according to need. Besides, the electronic control unit 100 is functionally equipped with an engine stop control unit 102 that performs stop control of the engine 24 as an essential part of the invention.

The engine stop control unit 102 is activated if it is determined that the engine 24 should be stopped, for example, if a changeover to motor running is made during engine running. If it is determined that the engine 24 should be stopped, the engine stop control unit 102 stops the supply of fuel to the engine 24, and outputs to the inverter 30 a command to output the negative torque Tm1 from the first electric motor MG1. Thus, a torque in such a direction as to stop the engine 24 is transmitted from the carrier CAO to the engine 24 via the damper 38 due to a differential effect of the planetary gear train 26, and hence the engine rotational speed Ne decreases. Then, if the engine rotational speed Ne becomes equal to or lower than a predetermined value that is set in advance or if a determined time that is set in advance elapses since the start of engine stop control, the engine stop control unit 102 starts removing the negative torque Tm1 of the first electric motor MG1, and further increases the torque Tm1 in the positive direction (toward the positive side) to a predetermined value c at which the large hysteresis torque (H1+H2) is generated. This predetermined value α of the first electric motor MG1 is set to a torque at which the damper 38 is twisted in the negative direction (toward the negative side) to a range where the large hysteresis torque can be sufficiently used, for example, a range where the damper 38 operates at the spot B of FIG. 5, or the like.

Figure 7:
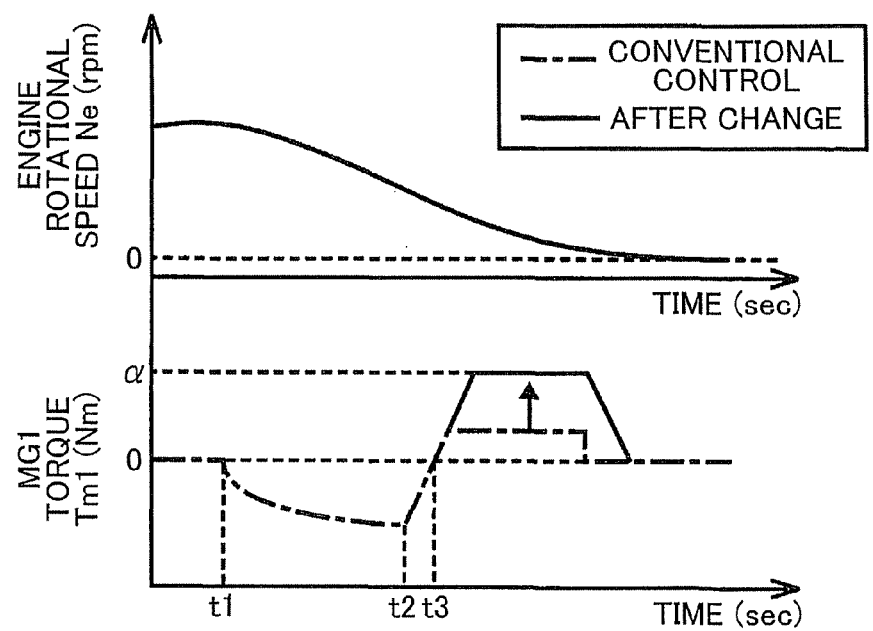
FIG. 7 includes time charts showing an operation state at the time when engine stop control according to the invention of the present application is performed.

FIG. 7 includes time charts illustrating a result of operation performed by the engine stop control unit 102. Incidentally, solid lines indicate the operation result of control according to this embodiment of the invention, and an alternate long and short dash line shows the operation result of conventional control. If it is determined that the engine 24 should be stopped at the time point t1 of FIG. 7, the negative torque Tm1 is output from the first electric motor MG1, whereby the engine rotational speed Ne decreases. Then, if the engine rotational speed Ne becomes equal to or lower than a predetermined value or the elapsed time from t1 exceeds a predetermined value time at the time point t2, the removal of the negative torque of the first electric motor MG1 is started. Then, if the torque Tm1 of the first electric motor MG1 becomes equal to zero at a time point t3, the torque Tm1 of the first electric motor MG1 is changed over to a positive torque, and is increased to the predetermined value α that is set in advance as indicated by the solid line. This predetermined value α is set to a value at which the large hysteresis can be sufficiently used, and is set, for example, to a value in the range of the spot B in FIG. 5. Specifically, the predetermined value α is set to a value which is obtained in advance through an experiment or an analysis and at which a twist greater than a twist resulting from torque fluctuations generated in stopping the engine 24 is obtained, namely, a value at which the damper 38 is always held at the negative twist angle θ even if a twist results from torque fluctuations. Accordingly, even if torque fluctuations occur in stopping the engine, the large hysteresis torque can be generated, and the torque fluctuations can be effectively damped by the large hysteresis torque. Besides, the predetermined value α need not always be set to a constant value. For example, the predetermined value α may be appropriately changed in accordance with the electric motor temperature of the first electric motor MG1 or the like. Besides, the predetermined value α that is set in stopping the engine may be appropriately changed through, for example, learning control.

Figure 8:
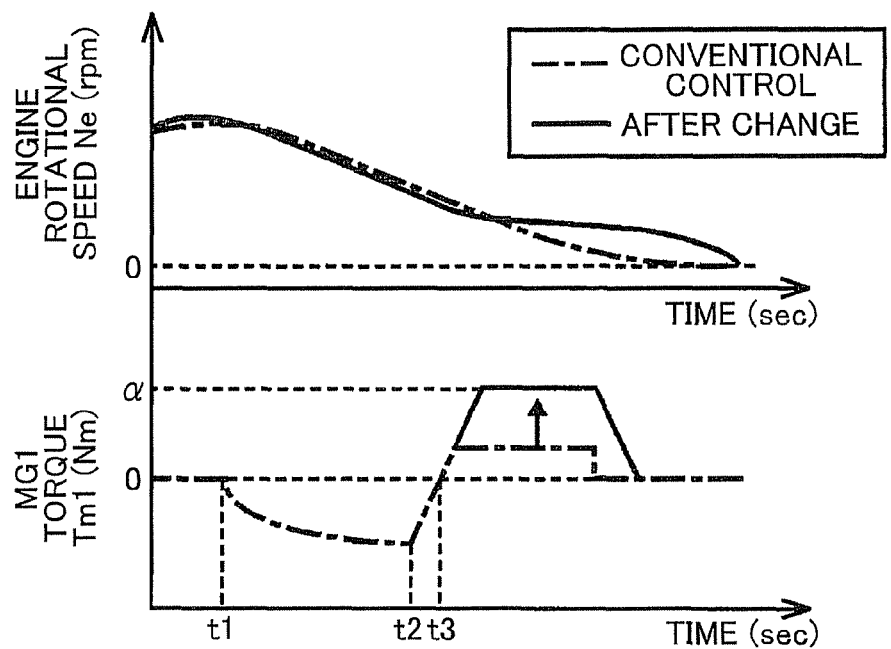
FIG. 8 includes time charts for illustrating a problem that is caused when engine stop control according to the invention of the present application is performed.
Figure 9:
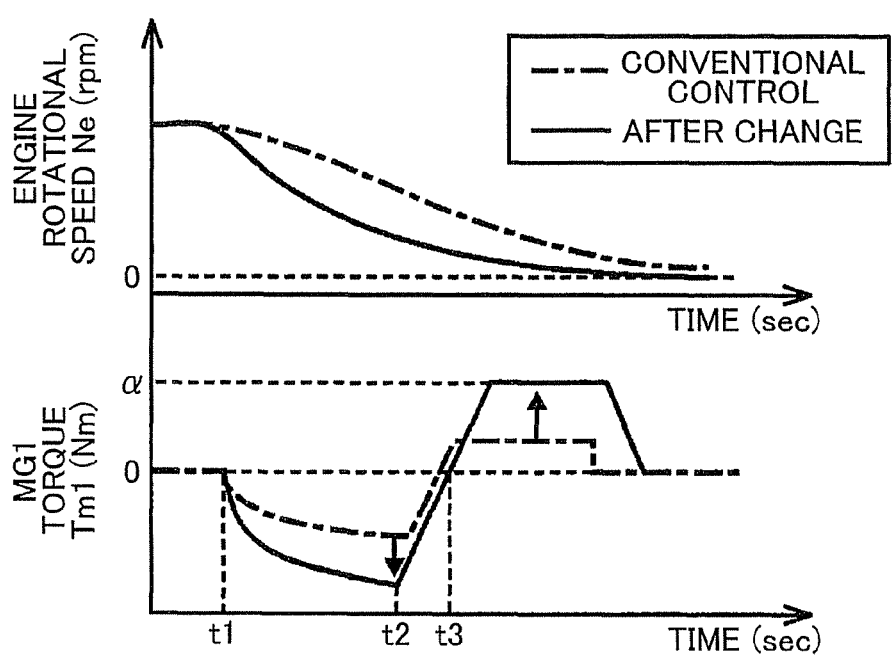
FIG. 9 includes other time charts showing an operation state at the time when engine stop control according to the invention of the present application is performed.

It should be noted herein that since the positive torque Tm1 of the first electric motor MG1 is larger than before, the engine rotational speed Ne may not be reduced within a predetermined time as indicated by a solid line of FIG. 8. In such a case, as indicated by a solid line of FIG. 9, the magnitude of the negative torque Tm1 of the first electric motor MG1 that is output to reduce the engine rotational speed Ne is set still larger than a value of conventional control that is indicated by an alternate long and short dash line. Thus, the engine rotational speed Ne that is indicated by the solid line decreases more swiftly than in the case of conventional control indicated by an alternate long and short dash line. Even if the positive torque Tm1 is thereafter controlled to a value larger than before, the engine 24 can be stopped within a determined time.

The magnitude of the negative torque Tm1 at the time when the engine rotational speed Ne is reduced by this electric motor MG1 is preferably changed in accordance with, for example, the predetermined value α as the torque Tm1 that is output from the electric motor MG1 in stopping the engine 24 and applied in such a direction as to drive the engine 24. For example, in the case where the predetermined value α that is output from the first electric motor MG1 changes in accordance with the electric motor temperature of the first electric motor MG1 or the like, the negative torque Tm1 that is output from the first electric motor MG1 increases in proportion to the predetermined value α at that time.

FIG. 10 is a flowchart for illustrating an essential part of control operation of the electronic control unit 100, namely, control operation that makes it possible to reduce the generation of gear rattle noise in stopping the engine 24. This flowchart is repeatedly executed at intervals of an extremely short cycle time, for example, about several milliseconds to several dozens of milliseconds. Incidentally, all steps S1 to S4 of FIG. 10 correspond to the engine stop control unit 102.

First of all, it is determined in step S1 ("step" will be omitted hereinafter) whether or not a determination to stop the engine 24 has been made. Specifically, this corresponds to, for example, a case where the running state of the vehicle 8 changes over from engine running to motor running, or the like. If the result of S1 is negative, the present routine is terminated. If the result of S1 is positive, the negative torque Tm1 that is set in advance is output from the first electric motor MG1 in S2. Thus, a torque for stopping the engine 24 is transmitted to the engine 24 via the damper 38, and hence the engine rotational speed Ne decreases. Then, it is determined in S3 whether or not a condition for starting so-called torque removal to reduce the negative torque Tm1 that is output from the first electric motor MG1 is fulfilled. For example, if the engine rotational speed Ne becomes equal to or lower than the predetermined value that is set in advance or if the predetermined time that is set in advance elapses since the start of decrease in the engine rotational speed Ne by the first electric motor MG1, the result of this step is positive. If the result of S3 is negative, a return to S2 is made, and the negative torque Tm1 is continuously output from the first electric motor MG1. If the result of S3 is positive, the removal of the negative torque of the first electric motor MG1 is started, and the torque Tm1 of the first electric motor MG1 is increased to the predetermined value αthat is set in advance. Accordingly, the twist angle θ of the damper 38 is in the range of the spot B shown in FIG. 5, and the large hysteresis torque can be generated. Large torque fluctuations that are generated in stopping the engine can be effectively damped by this large hysteresis torque, and gear rattle noise can be suppressed.

As described above, according to this embodiment of the invention, if the negative torque Tm1 is output from the first electric motor MG1 to reduce the engine rotational speed Ne and then the negative torque Tm1 is removed to prevent reverse rotation of the engine 24 in stopping the engine, the reactive force resulting from compression of the engine 24 cannot be suppressed, and the magnitude of torque fluctuations increases. As a measure against this phenomenon, the torque Tm1 is output from the first electric motor MG1 until the damper 38 assumes a state of being twisted in the negative direction (toward the negative side). Therefore, the range where the hysteresis torque is large can be utilized, and the magnitude of torque fluctuations can be effectively reduced by the hysteresis torque. Accordingly, the magnitude of torque fluctuations generated in stopping the engine can be reduced, and hence gear rattle noise that is generated at that time can be suppressed.

Besides, according to this embodiment of the invention, the torque Tm1 of the first electric motor MG1 that renders the damper 38 in a state of being twisted in the negative direction (toward the negative side) is set to such a value that a twist greater than a twist resulting from torque fluctuations generated in stopping the engine is obtained. In this manner, when the engine is stopped, the damper 38 is always in a state of being twisted in the negative direction (toward the negative side). Therefore, the range where the hysteresis torque is large can be utilized. Accordingly, the torque fluctuations can be effectively damped by this large hysteresis torque (H1+H2).

Although the embodiment of the invention has been described hereinabove in detail on the basis of the drawings, the invention is also applicable to the following aspects as well.

For example, in the foregoing embodiment of the invention, the hybrid vehicle 8 is structured such that the first electric motor MG1 is coupled to the damper 38 and the engine 24 via the planetary gear train 26, but may also be structured such that the engine 24 and the electric motor MG1 are coupled to each other via a clutch or directly coupled to each other. That is, the invention is appropriately applicable to a hybrid vehicle that is configured such that the damper 38 is interposed in a motive power transmission path between the engine 24 and the electric motor MG1.

Besides, in the foregoing embodiment of the invention, the damper 38 is equipped with the first hysteresis mechanism 64 and the second hysteresis mechanism 65, thereby realizing a twist characteristic as shown in FIG. 5. However, the specific structure of the hysteresis mechanisms is not thus limited. That is, the specific mechanism of a damper is not limited in particular if the damper has the twist characteristic shown in FIG. 5.

Besides, in the foregoing embodiment of the invention, the large hysteresis torque is uniformly generated as soon as the damper 38 assumes a negative twist angle.

However, it is also acceptable to adopt a configuration in which a small hysteresis torque is generated in, for example, a minor twist angle range.

Besides, in the foregoing embodiment of the invention, the automatic transmission 22 is provided. However, the specific structure of the transmission is not limited only to the automatic transmission 22, but can be appropriately changed into, for example, a further multiple-staged transmission, a belt-type continuously variable transmission, or the like. Furthermore, the transmission may be omitted.

While the invention has been described with reference to the example embodiment thereof, it is to be understood that the invention is not limited to the described example embodiment or construction. To the contrary, the invention is intended to cover various modifications and equivalent arrangements. In addition, while the various elements of the example embodiment are shown in various combinations and configurations, other combinations and configurations, including more, less or only a single element, are also within the scope of the invention.

What is claimed is:

1. A control device for a hybrid vehicle that is equipped with an engine, an electric motor, and a damper interposed on a power transmission path between the engine and the electric motor, comprising:
   a hysteresis mechanism configured to have a characteristic that a hysteresis torque generated due to a twist of the damper in a negative direction in a case where the damper transmits a driving force from the electric motor toward the engine, is larger than a hysteresis torque generated due to a twist of the damper in a positive direction in a case where the damper transmits a driving force from the engine toward the electric motor, the hysteresis mechanism being configured to reduce an engine rotational speed by the electric motor in stopping the engine, and the hysteresis mechanism being provided in the damper; and
   a controller configured to cause a torque of the electric motor to be output such that the damper is twisted in the negative direction when a torque is supplied from the electric motor to the engine in a direction for driving the engine in stopping the engine;
   the controller configured to set the torque of the electric motor such that the torque of the electric motor that causes the damper in a state of being twisted in the negative direction is set to a value that ensures a twist resulting from torque fluctuations caused in stopping the engine within the negative direction.

2. The control device for the hybrid vehicle according to claim 1, wherein the controller is configured to set a torque of the electric motor such that a torque of the electric motor that causes the damper in a state of being twisted in the negative direction is set to a value that ensures a twist greater than a twist resulting from torque fluctuations caused in stopping the engine.

3. The control device for the hybrid vehicle according to claim 1, wherein the controller is configured to change a magnitude of a torque at a time when the engine rotational speed is reduced by the electric motor, in accordance with a magnitude of a torque output from the electric motor in a direction for driving the engine, in stopping the engine.

* * * * *